United States Patent [19]
Reigler et al.

[11] 3,865,928
[45] Feb. 11, 1975

[54] PREPARATION OF ALUMINUM HYDRIDE

[75] Inventors: Paul F. Reigler, Midland; Lz F. Lamoria, Bay City, both of Mich.

[73] Assignee: The Dow Chemical Company, Midland, Mich.

[22] Filed: Mar. 2, 1965

[21] Appl. No.: 437,635

[52] U.S. Cl. ................................................ 423/645
[51] Int. Cl. ............................................... C01b 6/00
[58] Field of Search ........ 23/204; 260/665; 423/645

[56] References Cited
OTHER PUBLICATIONS
Wiberg, AEC-TR-1931, "New Results in Preparative Hydride Research," (1954), page 16.

Primary Examiner—Benjamin R. Padgett
Assistant Examiner—E. A. Miller
Attorney, Agent, or Firm—C. Kenneth Bjork

[57] ABSTRACT

A method for preparing light metal hydrides and particularly a hexagonal crystalline, substantially non-solvated aluminum hydride by reacting lithium aluminum hydride and beryllium chloride in the presence of an inert solvent for the reactants and aluminum hydride but wherein lithium chloride and residual beryllium values are substantially insoluble. The aluminum hydride solution is separated from the residual solid by-products, solvent removed therefrom and the resulting aluminum hydride product heated at an elevated temperature of from about 50° to about 140° C. under reduced pressure for about 2 to 24 hours thereby to prepare a substantially non-solvated, hexagonal crystal structure aluminum hydride.

4 Claims, No Drawings

PREPARATION OF ALUMINUM HYDRIDE

This invention relates to a method for preparing light metal hydrides and more particularly is concerned with a novel process for preparing a hexagonal crystal structure, substantially non-solvated aluminum hydride.

The present novel process comprises reacting lithium aluminum hydride and beryllium chloride in the presence of an inert solvent under substantially anydrous conditions. Aluminum hydride is produced which remains dissolved in the inert solvent. This solution is separated from the reaction by-products and subsequently a substantially solvent-free, ether-insoluble aluminum hydride of hexagonal crystal structure is recovered from the product solution.

In actual practice of the invention, usually an alkyl ether solution of beryllium chloride ($BeCl_2$) is added to an alkyl ether solution of lithium aluminum hydride ($LiAlH_4$) at a temperature of from about room temperature, i.e. about 18°–25° C., up to about the boiling point of the solution in an amount such that the ratio of $LiAlH_4/BeCl_2$ on a gram mole basis ranges from about 2 to about 5 or more. The by-product precipitate which forms during the reaction consists primarily of lithium chloride and the beryllium values. This is separated from the reaction mass, ordinarily by filtration. The ether solvent is stripped from the residual product solution and the resulting substantially dry aluminum hydride product mass heated with agitation of the product at an elevated temperature of from about 50° to about 140° C., preferably from about 60° to about 75° C. under reduced pressure, which at a maximum is about 0.1 millimeter mercury absolute, for a period of from about 2 to about 24 hours, preferably from about 6 to about 20 hours. The resulting solid product ordinarily is washed with an ether and dried. The so-washed and dried product consists of a substantially ether-free, ether-insoluble hexagonal crystal structure aluminum hydride having a relatively low impurity content.

In a preferred embodiment of the invention, a diethyl ether solution of beryllium chloride, which is substantially free from insoluble matter, is added slowly with stirring at about room temperature to a diethyl ether solution of lithium aluminum hydride which also is substantially free from insolubles, in an amount providing $LiAlH_4/BeCl_2$ in a gram mole ratio of from about 2 to 3. Lithium chloride and beryllium values precipitate directly as the solution of beryllium chloride is added to the lithium aluminum hydride solution. Following the completion of admixing the reactants, the reaction mixture is agitated for a short period of time, ordinarily from about 2 to about 10 minutes to assure substantial completion of the reaction. The solution is separated, ordinarily by filtration, from the solid by-product precipitate.

Solvent is stripped from the residual substantially solid-free product solution and the resulting dry product heated at a temperature of from about 60° to about 75° C. for a period of from about 6 to about 20 hours under a maximum pressure of about 0.1 millimeter mercury absolute.

The resulting solid product ordinarily is washed with diethyl ether, n-dipropyl or n-diisopropyl ether to remove any excess reactants and other ether soluble impurities therefrom. The so-washed product consists primarily of a substantially ether-free, ether-insoluble aluminum hydride of hexagonal crystal pattern exhibiting a specific X-ray diffraction pattern peculiar to the novel aluminum hydride form disclosed and claimed in a copending U.S. Pat. application, Ser. No. 179,509, by N. E. Matzek and D. F. Musinski.

The present process is carried out under substantially anhydrous conditions in an inert atmosphere such as nitrogen or argon and the like.

Ordinarily the process is carried out at atmospheric pressures. However, superatmospheric pressures can be employed if desired.

An unexpected advantage of the present novel process resides in the fact that the desirable and useful non-solvated hexagonal aluminum hydride product is prepared directly from the product reaction mass. With processes employed heretofore it has been necessary to utilize an alkali metal borohydride, particularly lithium borohydride, in the reaction mass to convert the aluminum hydride product into the highly desirable hexagonal crystalline substantially non-solvated form. Further it also is unexpected that beryllium chloride can be used to prepare aluminum hydride by reaction with lithium aluminum hydride as this has not been suggested or used prior to the present invention.

Solvents suitable for use in the present novel process are those liquid materials inert to the reactants and products in which the beryllium chloride and lithium aluminum hydride reactants as well as the freshly prepared aluminum hydride product are soluble but in which the reaction by-products are substantially completely insoluble. Organic liquids, particularly aliphatic ethers such as diethyl ether, n-dipropyl ether and iso-dipropyl ether or mixtures of such ethers with hydrocarbons, e.g. diethyl ether-benzene, are especially suitable for use in the practice of the present novel process, diethyl ether being a preferred solvent. The quantities of solvent to be used in preparing the reactant solutions are not critical except that at a minimum the amount must be such that the reactants are completely dissolved therein. Maximum amounts of solvent to be used ordinarily are limited to those volumes such that the reaction mixture does not become unduly bulky and unwieldly to handle both during the initial reaction and subsequent solid-liquid separation, solvent stripping and the like operations. Conveniently, solutions ranging from about 0.2 to about 1 molar in the reactant solutes are employed.

The reaction solutions can be used as prepared. However, for obtaining optimum yields and the highest purity products usually the reactant solutions are filtered or otherwise treated prior to mixing to remove insoluble matter therefrom The following Examples will serve to further illustrate the present invention but are not meant to limit it thereto.

EXAMPLE 1

About 2.4 grams of lithium aluminum hydride (~0.063 gram mole) was dissolved in about 63 cubic centimeters of diethyl ether. The resulting solution, about 1 molar in $LiAlH_4$ concentration, was filtered to remove any insoluble matter therefrom. About 2.0 grams of beryllium chloride (~0.025 gram moles) was dissolved in a separate portion of about 100 cubic centimeters of diethyl ether to provide a solution about 0.25 molar in $BeCl_2$ concentration. This also was filtered to remove insoluble matter therefrom.

The lithium aluminum hydride solution was stirred and the beryllium chloride solution added slowly thereto. Both solutions were at about room temperature, i.e. ~18° to 25° C. As the reactant solutions were mixed, a white precipitate formed almost instantaneously as the two solutions made contact. Following completion of the beryllium chloride solution addition, the reaction mixture was stirred for about four minutes.

The solid by-product was removed by filtering through a glass frit and washed twice with diethyl ether.

All of the hereinbefore listed procedural steps, including the initial reactant solution preparation were carried out in a dry box under a substantially anhydrous, nitrogen atmosphere.

Following the solid-liquid separation, the two product phases were removed from the dry box and subjected to a low pressure heating for a predetermined period of time.

The precipitated solid product was dried by heating at 60° C. for about 6 hours. X-ray diffraction analysis showed this by-product precipitate to be chiefly lithium chloride. Elemental chemical analysis of this dried solid gave Li-13.3%; Cl-55.9%; Be-5.8%; Al-6.65%; H-1.95%; C-2,8%.

The ether solution (filtrate) was subjected to a reduced pressure of about 0.1 mm mercury absolute at about 25° C. to strip the ether therefrom.

The resulting solid product mass was heated at a temperature of about 75° C. for about 20 hours while maintaining an absolute pressure of about 0.1 millimeter mercury on the system. X-ray diffraction analysis of the so-treated product indicated the chief constituent to be a specific, substantially non-ether solvated, hexagonal crystal structure aluminum hydride of the same form as disclosed and claimed in application Ser. No. 179,509. Lithium aluminum hydride, lithium chloride and aluminum were shown to be present as minor constituents.

If desired this aluminum hydride product can be purified further by washing with diethyl ether, filtering and drying for about 1 hour at about 65° C. at an absolute pressure of about 0.1 millimeter mercury. This removes substantially all of the lithium aluminum hydride, lithium chloride and aluminum leaving the substantially solvent free aluminum hydride.

EXAMPLE 2

Two runs were made employing the same technique and procedural steps described for EXAMPLE 1 wherein the ratios of starting materials were varied in accordance with the value shown in Table I, which follows:

tially non-solvated, hexagonal crystal form of aluminum hydride the diffraction pattern of which corresponded to that given by aluminum hydride product of EXAMPLE 1.

By following the same general procedure as described directly hereinbefore in the EXAMPLES, aluminum hydride which is of hexagonal crystal structure and substantially non-solvated can be prepared by reacting lithium aluminum hydride and beryllium chloride at $LiAlH_4/BeCl_2$ gram mole ratios of from about 2 to about 5 wherein the reaction is carried out in a solvent of diethyl ether, n-dipropyl ether, iso-dipropyl ether and mixtures of such ethers with benzene.

Various modifications can be made in the process of the present invention without departing from the spirit or scope thereof for it is understood that we limit ourselves only as defined in the appended claims.

We claim:

1. A novel process for preparing a substantially non-solvated, hexagonal crystal structure aluminum hydride which comprises;

a. reacting under substantially anhydrous conditions in an inert atmosphere a solution of beryllium chloride and lithium aluminum hydride wherein the ratio of lithium aluminum hydride to beryllium chloride in the reaction mixture on a gram mole basis ranges from about 2 to about 5, the solvent for said lithium aluminum hydride and beryllium chloride being a liquid material inert to the reactants and products and dissolving said beryllium chloride and lithium aluminum hydride reactants and the aluminum hydride product produced therefrom, b. separating the solution of said aluminum hydride from the residual lithium chloride and beryllium values solid products co-produced, c. removing said solvent from the so-separated aluminum hydride solution, d. heating the resulting substantially dry aluminum hydride product at an elevated temperature of from about 50° to about 140° C. under reduced pressure for a period of from about 2 to about 24 hours, and e. recovering a substantially non-solvated, aluminum hydride of hexagonal crystal structure.

2. The process as defined in claim 1 wherein the reaction of said beryllium chloride and lithium aluminum hydride is carried out in a diethyl ether solvent, and the heating of the substantially dry aluminum hydride product is carried out at a temperature of from about 60° to about 80° C. for a period of from about 6 to about 20 hours at a maximum pressure of about 0.1 millimeter absolute.

3. A process for preparing a substantially ether-free, ether-insoluble, hexagonal crystal structure aluminum hydride which comprises:

a. adding under substantially anhydrous conditions in

Table I

| Run No. | Lithium Aluminum Hydride Solution | | | Beryllium Chloride Solution | | | $LiAlH_4/BeCl_2$ |
| --- | --- | --- | --- | --- | --- | --- | --- |
| | ($LiAlH_4$) g. | g. moles | (Diethyl Ether) cubic cent. | ($BeCl_2$) g. | g. moles | (Diethyl Ether) cubic cent. | gram mole ratio |
| 1 | 2.18 | 0.0575 | 50 | 2.28 | 0.0285 | 92 | 2.0 |
| 2 | 5.7 | 0.15 | 150 | 4.0 | 0.05 | 200 | 3.0 |

In both of these runs, the resulting solid by-product which precipitated during the reaction was shown by X-ray diffraction primarily to be lithium chloride.

The solid product recovered from the ether product solution after the desolvation treatment was found by X-ray diffraction to have as chief constituent a substanan inert atmosphere a diethyl ether solution of beryllium chloride to an agitated diethyl ether solution of lithium aluminum hydride in an amount providing a lithium aluminum hydride to beryllium chloride gram mole ratio of from about 2 to about 3, b. separating the resulting aluminum hydride product solution from the residual precipitated solid lithium chloride and beryllium values by-product, c. removing said diethyl ether solvent from the so-separated aluminum hydride solution, d. heating the resulting substantially dry aluminum hydride product at a temperature of from about 70° to about 80° C. for a period of from about 6 to about 20 hours at a maximum pressure of about 0.1 millimeter mercury absolute, and e. recovering a substantially ether free, ether-insoluble aluminum hydride of hexagonal crystal pattern.

4. The process as defined in claim 3 and including the step of separating any solids from the diethyl ether solutions of said lithium aluminum hydride and said beryllium chloride prior to admixing.

* * * * *